United States Patent [19]  [11] 4,256,249
Konno et al.  [45] Mar. 17, 1981

[54] PHOTOGRAPHING FILM CONVEYING DEVICE

[75] Inventors: Takeshi Konno; Masaharu Inaba; Takayuki Inayama, all of Fujinomiya, Japan

[73] Assignee: Fuji Photo Film Co., Ltd., Minami-ashigara, Japan

[21] Appl. No.: 1,086

[22] Filed: Jan. 5, 1979

[30] Foreign Application Priority Data

Jan. 10, 1978 [JP] Japan ............................. 53-1357[U]

[51] Int. Cl.$^3$ ............................................ B65H 17/22
[52] U.S. Cl. ................................... 226/181; 271/208
[58] Field of Search ............................... 226/170–173, 226/181; 361/212, 214, 220, 221; 250/475.1–477; 198/1, 165; 74/232, 231 S; 271/34, 45, 193, 208, 66–69

[56] References Cited

U.S. PATENT DOCUMENTS

| 1,105,036 | 8/1914 | Pirot | 226/172 X |
| 2,318,441 | 5/1943 | Walton et al. | 74/232 |
| 2,576,882 | 11/1951 | Koole et al. | 198/1 |
| 2,899,201 | 7/1959 | Mukautz | 271/45 |
| 3,033,433 | 5/1962 | Kottman et al. | 226/108 |
| 3,515,328 | 6/1970 | Smith, Jr. | 226/172 |
| 3,625,508 | 12/1971 | Shiragai et al. | 271/34 |
| 3,690,646 | 9/1972 | Kolibas | 271/45 |

FOREIGN PATENT DOCUMENTS 1300188 6/1962 France ................................. 74/231 S Primary Examiner—Leonard D. Christian
Attorney, Agent, or Firm—Sughrue, Rothwell, Mion, Zinn and Macpeak

[57] ABSTRACT

Each of a pair of belts for conveying a photographing film therebetween comprises an insulating layer and at least one electrically conductive layer whose surface resistivity is less than $10^9$ ohms.

2 Claims, 3 Drawing Figures

PHOTOGRAPHING FILM CONVEYING DEVICE

BACKGROUND OF THE INVENTION

This invention relates to a device for conveying photographing films (hereinafter referred to as "films"), and more particularly to a film conveying device in which a fog problem (hereinafter referred to a "a static problem") caused by the discharge of static electricity when a film held between a pair of flexible belts (hereinafter referred to as "belts") is conveyed, is prevented.

In general, a variety of devices which convey a film by holding it between belts are employed for photographing apparatuses or processing apparatuses which handle films.

For instance, a film conveying device as shown in FIG. 1 is employed for a medical X ray type automatic photographing apparatus. In this conventional device, an X ray film 1 is held between fluorescent latensification sheets 8 and 9 bonded to a pair of belts 3 and 4 and is conveyed to a predetermined position by means of conveying rollers 5, 6 and 7. After completion of an X ray photographing operation, the film 1 is returned to the position where it was inserted thereinto, and then the film 1 is removed from the film conveying device. In the conventional film conveying device of the medical X ray type photographing apparatus, when the belts 3 and 4 are wound or rewound, the belts 3 and 4 are electrically charged by friction and the separation of the belts. The electric charges are discharged between the belts and the X ray film 1, or between the belts and the latensification sheets 8 and 9. The discharge usually occurs when the X ray film 1 held between the belts is conveyed, or when it is taken out of the latensification sheets 8 and 9; as a result of which the static problem is often caused.

Heretofore, the following methods have been employed to prevent the static trouble. In one conventional method, a metal brush or metal braid is brought into contact with the conveying belts 3 and 4 to remove the static electricity charge therein. In another method, positive and negative ions are generated by a corona discharge type electricity remover, thereby to eliminate the charges. In a third known method, electrically conductive belts are made of flexible plastic or rubber sheets which contain a charge preventing agent such as carbon black, or a surface active agent to prevent the charging of the belts.

However, the method using the metal brush or metal braid is insufficient in charge removing effect. The method using the corona discharge type electricity remover is disadvantageous in that the discharge often gives fogs to the films. Furthermore, the method using the electrically conductive belts containing the charge preventing agent is not effective unless a large amount of charge preventing agent is used. If a large amount of charge preventing agent is used, the strength and durability of the belts are reduced, and accordingly the belts may be worn or broken when used repeatedly. These drawbacks become more significant because recently the operating speed of the photographing apparatus has been made considerably higher.

SUMMARY OF THE INVENTION

Accordingly, an object of the invention is to eliminate the above-described difficulties accompanying a conventional film conveying device. More specifically, an object of the invention is to provide a film conveying device which comprises electrically conductive belts which are strong and durable and which will never be worn or cause the static problem even if repeatedly used.

Another object of the invention is to provide a film conveying device for an X ray photographing apparatus, which comprises film conveying belts having electrical conductive layers and latensification layers, and which never causes friction and static problem even is repeatedly used.

The foregoing objects and other objects of the invention have been achieved by providing a film conveying device of the type wherein a film is held between a pair of belts and is conveyed, each of the belts having at least one electrical conductive layer whose surface resistivity is less than $10^9$ ohms.

DETAILED DESCRIPTION OF THE EMBODIMENTS

One preferred embodiment of this invention will be described with reference to FIGS. 2 and 3 in detail.

Figure 2:
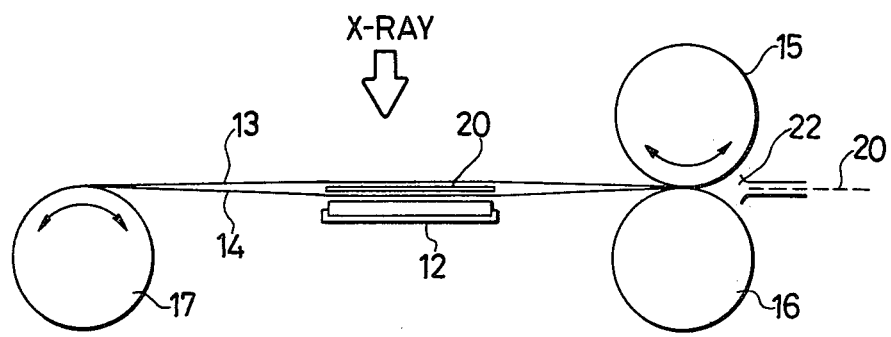
FIG. 2 is a side view showing the essential components of a film conveying device according to the invention.

FIG. 2 is an explanatory diagram showing the essential parts of a film conveying section of a medical X ray type automatic photographing apparatus. FIG. 3 is an enlarged perspective view of a part of the film conveying section.

Referring to FIG. 2, reference numerals 13 and 14 designate a pair of film conveying belts, each of which is formed by laminating an electrical conductive layer and a fluorescent latensification layer (hereinafter referred to as a latensification layer) on a polyethylene terephthalate substrate. The film conveying belts 13 and 14 are wound on rotary drums 15 and 16 provided at the film feeding side, respectively, and the other end portions of the belts are wound together on a rotary drum 17 provided at the film winding side. The belts 13 and 14 are driven by rotating the rotary drums 15, 16 and 17, and a film 20 sandwiched therebetween is conveyed in a desired direction.

Figure 3:
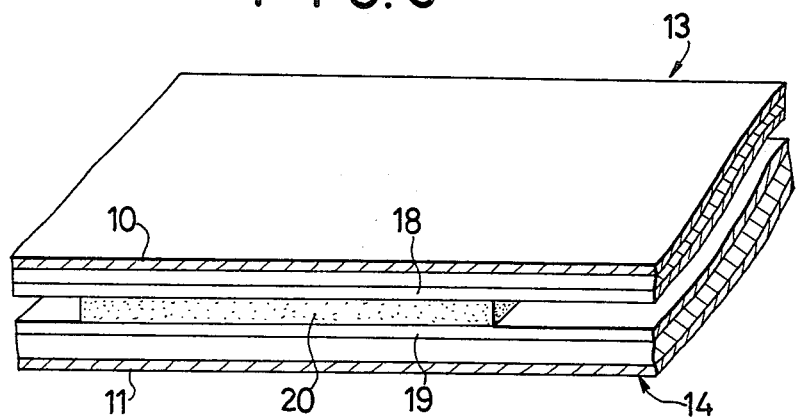
FIG. 3 is an enlarged perspective view showing a part of the film conveying device according to the invention.

The belts 13 and 14 are constructed as shown in detail in FIG. 3. More specifically, the aforementioned latensification layers 18 and 19 are provided on the surfaces of the belts 13 and 14 which are in confronting relation (hereinafter referred to as "belt front surfaces"), respectively, and the electrical conductive layers 10 and 11 are provided on the opposite surfaces thereof (hereinafter referred to as "belt rear surfaces").

In the medical X ray type photographing apparatus provided with the film conveying device thus constructed, the film 20 is inserted thereinto through a film inserting and removal opening 22. Then, the film 20 is held between the latensification layers 18 and 19 of the belts 13 and 14 and is delivered to a photographing position, where it is placed on a contact cushion board 12, and the photographing is carried out.

Upon completion of the photographing operation, the conveying drums 15, 16 and 17 are rotated in the opposite direction so that the belts 13 and 14 are moved in the opposite direction while being wound on the drums 15 and 16, respectively. As a result, the film 20 is taken out of the film insertion and removal opening 22.

In the reciprocating conveyance as described above, charges different in sign from charges generated in the belts 13 and 14 are generated in the electrical conductive layers 10 and 11. Accordingly, the strengths of electric fields created between the belts 13 and 14 and the surfaces of the film 20 by the charges induced in the belts can be reduced, and therefore the static problem caused by discharge which was heretofore likely to occur when the film was removed from the belts 13 and 14 can be positively prevented.

As is apparent from the above description, according to the invention, by the provision of the electrical conductive layers on the belts, spatial energy caused by the charges generated during the belt conveyance is concentrated between the belts and the conductive layers, not between the belts and the film, whereby the strengths of electric fields created by the charges are reduced to prevent the discharge between the belts and the film.

Thus, the principle of the present invention is completely different from the principle of the conventional method in which the discharge is prevented by reducing the amount of charges on the surfaces of the belts or by decreasing the electrical conductivity of the belt surfaces.

In this connection, it is well known in the art that the rate of inducing charges in the above-described electrical conductive layer depends on the surface resistance of the electrical conductive layer; that is, it takes a relatively long time if the surface resistance is high, and it takes a relatively short time if low (cf. "Macromolecule Static Electricity" by Kanji Sasaki, Macromolecule Vol. 13, No. 6, pp 354–359).

Accordingly, in order that the electrical conductive layers are formed on the belts 13 and 14 to prevent the discharge between the belts 13 and 14 and the film 20 as in this invention, it is necessary to reduce the surface resistivity of the electrical conductive layer to a certain value or less according to the amount of charge in the film 20.

As a result of the inventors' study, it has been found that it is preferable that the surface resistivity of the electrical conductivity is less than $10^9$ ohms, and that the significant effect can be obtained by providing the electrical conductive layer on the front surface (or the rear surface) of the belt or by providing the electrical conductive layer as an intermediate layer of the belt.

The surface resistivity was measured as follows: A test piece was held between parallel electrodes of stainless steel 10 cm in length, which were spaced 0.2 cm from each other, and it was measured with an electrometer (TR-8651) made by "Takeda Riken" for one minute.

The materials of the electrical conductive layer employed in this invention are preferably aluminum, silver, copper, indium, chromium, nickel, manganese, tin, zinc, or lead, or their oxides, carbon, surface active agents, and organic semiconductors.

The electrical conductive layer is formed by laminating one of the above-described materials, or a mixture of two or more of the materials, on the front surface (or the rear surface) of the belt, or in the belt (as an intermediate layer therein).

The belt employed in the invention can be made of any material as long as it is thin, rigid and flexible. However, the material of the belt is preferably polyethylene terephthalate, nylon, polyethlene, polystyrene, cellulose acetate, polyethylene fluoride, or their copolymers or mixtures. Especially in the case where an insulating material having a surface resistance higher than $10^{13}$ ohms was used, the effect of the conductive layer according to the invention was significant.

The lamination of the above-described materials on the belt may be achieved in accordance with a method disclosed by Japanese Patent Application Laid-Open No. 37957/1976 in which the conductive material described above is vacuum-deposited on the belt subjected to surface activation, or a method in which the conductive material is deposited on the belt by high frequency sputtering or chemical coating, and it is oxidized as required.

In general, the electrical conductive layer is formed on the rear surface of the belt; however, a protective layer may be provided on the front surface of the belt for preventing the occurrence of scratches due to friction. In another lamination method, two or more conductive layers and the belt are laminated.

It goes without saying that the film conveying device according to the invention can be applied not only to the film conveying device of the medical X ray type photographing apparatus, in which the belts having the latensification layers are employed, but also to film conveying devices in automatic film developing apparatus using endless belts having no latensification layers, or in printers and their peripheral equipment. The most significant effect of the invention can be obtained when it is employed as the film conveying device of the automatic X ray photographing apparatus in which static problems are likely to occur because of its high speed.

As was described above, according to this invention, the static troubles which are often caused with the conventional film conveying device can be completely prevented. Therefore, the practical effect of the invention should be highly appreciated.

In order to clarify the effects of the invention, several examples thereof will be described below:

EXAMPLE 1

Figure 1:
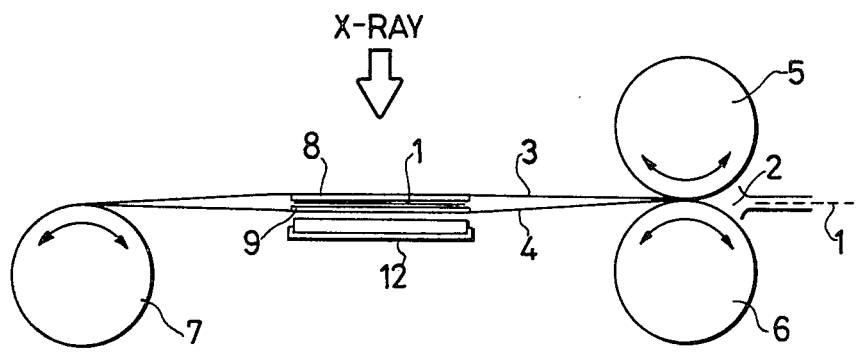
FIG. 1 is a side view showing the essential components of a conventional film conveying device in a medical X ray automatic photographing apparatus.

The device shown in FIG. 1 was used. Medical X ray film latensification sheets were bonded to the belts 3 and 4, which are 100μ in thickness and made of polyethlene terephthalate. Then, an X ray film was held between the latensification sheets, and was allowed to make one traversal and return between the left-hand drum 7 and the right-hand drums 5 and 6 at a maximum speed of 100 m/min by rotating drums 5, 6 and 7.

Next, instead of the above-described belts 100μ in thickness made of polyethylene terephthalate, different belts were used. The different belts were similarly 100μ in thickness and made of polyethylene terephthalate, but indium oxide ($In_2O_3$) films were formed on the rear surface of the belts in accordance with the vacuum deposition method disclosed by Japanese Patent Application Laid-Open No. 37957/1976, and latensification layers were formed substantially on the entire length of the front surfaces (confronting the film surfaces) of the belts. Then, similarly as in the above-described case, an X ray film was conveyed. The surface resistivity of the indium oxide film was $5.0 \times 10^4$ ohms at 25° C. and 25% RH.

After the conveyance of the X ray films, the films were subjected to development in an X ray film developer. The X ray film conveyed by the belts having no electrical conductive layers had a static problem in the form of spots in the central region (about ¼ of the entire area) of the film. On the other hand, the X ray film conveyed by the belts having the electrical conductive layers made of the indium oxide films has no static problem.

EXAMPLE 2

Belts 100μ in thickness made of polyethylene terephthalate were provided. Then, indium oxide films were vacuum-deposited on the front surfaces of the belts in the same manner as that in Example 1, and latensification layers were formed thereon. Then, an X ray film was conveyed similarly as in Example 1. The X ray film conveyed by the belts having the indium oxide films had no static trouble.

What is claimed is:

1. A photographing film conveying device of the type wherein a photographic film is held between a pair of conveyor belts of insulating material, characterized in that each of said belts is provided with at least one electrical conductive layer whose surface resistivity is less than $10^9$ ohms.

2. A photographing film conveying device for an X ray photographing apparatus as defined in claim 1, characterized in that each of said belts has a fluorescent latensification layer.

* * * * *